United States Patent
Trimble et al.

[19]

[11] Patent Number: 5,879,642
[45] Date of Patent: Mar. 9, 1999

[54] FIXED BED REACTOR ASSEMBLY HAVING A GUARD CATALYST BED

[75] Inventors: Harold J. Trimble, Richmond; Dennis R. Cash, Novato, both of Calif.

[73] Assignee: Chevron U.S.A. Inc.

[21] Appl. No.: 639,057

[22] Filed: Apr. 24, 1996

[51] Int. Cl.⁶ ........................................ B01J 8/04
[52] U.S. Cl. .................. 422/191; 422/141; 422/142; 422/143; 422/145; 422/147; 422/239; 422/311; 29/890
[58] Field of Search .................... 423/141, 142, 423/143, 145, 147, 191, 239, 311; 29/890

[56] References Cited

U.S. PATENT DOCUMENTS

| | | | |
|---|---|---|---|
| 2,567,207 | 9/1951 | Hoge | 196/52 |
| 2,631,968 | 3/1953 | Peery | 196/52 |
| 2,688,401 | 9/1954 | Schmitkons et al. | 209/172 |
| 2,882,912 | 4/1959 | Reeg et al. | 134/155 |
| 2,987,465 | 6/1961 | Johanson | 208/10 |
| 2,987,470 | 6/1961 | Turken | 208/253 |
| 3,197,288 | 7/1965 | Johanson | 23/289 |
| 3,336,217 | 8/1967 | Meaux | 208/143 |
| 3,398,085 | 8/1968 | Engle | 208/157 |
| 3,410,791 | 11/1968 | Perry et al. | 208/143 |
| 3,410,792 | 11/1968 | Driesen et al. | 208/143 |
| 3,470,090 | 9/1969 | Carson | 208/138 |
| 3,489,674 | 1/1970 | Borst, Jr. | 208/108 |
| 3,523,888 | 8/1970 | Stewart et al. | 208/157 |
| 3,524,731 | 8/1970 | Effron et al. | 23/288 |
| 3,541,002 | 11/1970 | Rapp | 208/143 |
| 3,652,450 | 3/1972 | Boyd | 208/146 |
| 3,652,451 | 3/1972 | Boyd | 208/146 |
| 3,685,971 | 8/1972 | Carson | 23/288 |
| 3,705,016 | 12/1972 | Ludwigsen et al. | 23/283 |
| 3,716,478 | 2/1973 | Kodera et al. | 208/152 |
| 3,723,072 | 3/1973 | Carson et al. | 23/288 |
| 3,725,247 | 4/1973 | Johnson et al. | 208/111 |
| 3,730,880 | 5/1973 | Van der Toorn et al. | 208/213 |
| 3,841,981 | 10/1974 | Layng | 208/48 |
| 3,870,623 | 3/1975 | Johnson et al. | 208/108 |
| 3,873,441 | 3/1975 | Jones | 208/166 |
| 3,880,598 | 4/1975 | Van der Toorn et al. | 23/289 |
| 3,887,455 | 6/1975 | Hamner et al. | 208/112 |
| 3,893,911 | 7/1975 | Rovesti et al. | 208/251 |
| 3,915,894 | 10/1975 | Clements et al. | 252/439 |
| 3,932,269 | 1/1976 | Lehman | 208/110 |
| 3,966,420 | 6/1976 | Pegels et al. | 23/288 |
| 3,972,803 | 8/1976 | Wolk et al. | 208/97 |
| 4,016,106 | 4/1977 | Sawyer et al. | 252/455 |
| 4,051,019 | 9/1977 | Johnson | 208/146 |
| 4,059,502 | 11/1977 | James | 208/152 |
| 4,119,530 | 10/1978 | Czajkowski et al. | 208/213 |
| 4,167,474 | 9/1979 | Sikonia | 208/140 |

(List continued on next page.)

FOREIGN PATENT DOCUMENTS

| | | |
|---|---|---|
| 1 217 756 | 2/1987 | Canada . |
| 1 550 285 | 8/1979 | United Kingdom . |
| WO 95/29970 | 11/1995 | WIPO . |
| WO 95/35160 | 12/1995 | WIPO . |

*Primary Examiner*—Jeffrey Stucker
*Attorney, Agent, or Firm*—Alan W. Klaassen

[57] ABSTRACT

A method, and a reactor, for hydroprocessing a hydrocarbon feed stream through multistage fixed catalyst beds contained within a single onstream reactor vessel, with a separate catalyst addition and a separate catalyst withdrawal system for the upper or top essentially fixed catalyst bed. The upper or top essentially fixed catalyst bed functions as a guard catalyst bed for removing a major proportion of contaminants (e.g. organometallic constituents) from a hydrocarbon feed stream in order to extend the life of one or more fixed catalyst beds serially disposed underneath the upper or top essentially fixed catalyst bed. Catalyst particles are withdrawn from the essentially fixed catalyst bed by slurrying or liquifying the catalyst particles in a container disposed within the reactor. A method for retrofitting a reactor assembly having two or more fixed catalyst beds in order to place a guard catalyst bed in the upper or top portion of the reactor assembly.

17 Claims, 7 Drawing Sheets

5,879,642
Page 2

U.S. PATENT DOCUMENTS

| | | | |
|---|---|---|---|
| 4,172,024 | 10/1979 | Simone et al. | 208/10 |
| 4,188,283 | 2/1980 | Czajikowski et al. | 208/143 |
| 4,213,850 | 7/1980 | Riddick, Jr. et al. | 208/216 |
| 4,217,206 | 8/1980 | Nongbri | 208/251 |
| 4,259,294 | 3/1981 | Van Zijll Langhout et al. | 422/190 |
| 4,287,088 | 9/1981 | Sirkar | 252/414 |
| 4,312,741 | 1/1982 | Jacquin | 208/11 |
| 4,344,840 | 8/1982 | Kunesh | 208/48 |
| 4,392,943 | 7/1983 | Euzen et al. | 208/152 |
| 4,398,852 | 8/1983 | Milligan | 406/47 |
| 4,411,768 | 10/1983 | Unger et al. | 208/59 |
| 4,411,771 | 10/1983 | Bambrick et al. | 208/112 |
| 4,422,960 | 12/1983 | Shiroto et al. | 502/206 |
| 4,444,653 | 4/1984 | Euzen et al. | 208/152 |
| 4,478,707 | 10/1984 | Bischoff et al. | 208/157 |
| 4,502,946 | 3/1985 | Pronk | 208/152 |
| 4,540,547 | 9/1985 | Schuurman | 422/49 |
| 4,571,326 | 2/1986 | Bischoff et al. | 422/207 |
| 4,576,710 | 3/1986 | Nongbri et al. | 208/58 |
| 4,590,045 | 5/1986 | van der Wal et al. | 422/216 |
| 4,639,354 | 1/1987 | Bischoff et al. | 422/140 |
| 4,664,782 | 5/1987 | Galiasso et al. | 208/143 |
| 4,684,456 | 8/1987 | Van Driesen et al. | 208/143 |
| 4,685,842 | 8/1987 | Smith et al. | 406/106 |
| 4,687,382 | 8/1987 | Smith | 406/168 |
| 4,716,142 | 12/1987 | Laine et al. | 502/220 |
| 4,725,571 | 2/1988 | Tuszynski | 502/220 |
| 4,738,770 | 4/1988 | Hastings et al. | 208/152 |
| 4,744,887 | 5/1988 | Van Driesen et al. | 208/152 |
| 4,753,721 | 6/1988 | McDaniel et al. | 208/143 |
| 4,767,523 | 8/1988 | Kukes et al. | 208/217 |
| 4,808,297 | 2/1989 | Chen | 208/164 |
| 4,820,676 | 4/1989 | Kukes et al. | 502/220 |
| 4,875,995 | 10/1989 | Van Driesen et al. | 208/152 |
| 4,960,571 | 10/1990 | Bhagat et al. | 422/194 |
| 4,968,409 | 11/1990 | Smith | 208/157 |
| 5,008,003 | 4/1991 | Smegal et al. | 208/254 |
| 5,021,147 | 6/1991 | Van Driesen et al. | 208/152 |
| 5,045,518 | 9/1991 | Heinerman et al. | 502/216 |
| 5,076,908 | 12/1991 | Stangeland et al. | 208/148 |
| 5,098,230 | 3/1992 | Schuerman | 406/143 |
| 5,100,629 | 3/1992 | Tampa | 422/140 |
| 5,209,840 | 5/1993 | Sherwood, Jr. et al. | 208/210 |
| 5,232,673 | 8/1993 | Notestein | 422/216 |
| 5,270,018 | 12/1993 | Scheuerman | 422/213 |
| 5,302,357 | 4/1994 | Kramer et al. | 422/219 |
| 5,308,476 | 5/1994 | Buttke et al. | 208/157 |
| 5,409,598 | 4/1995 | Kramer et al. | 208/148 |
| 5,472,928 | 12/1995 | Scheuerman et al. | 502/305 |
| 5,492,617 | 2/1996 | Trimble et al. | 208/148 |
| 5,498,327 | 3/1996 | Stangeland et al. | 208/148 |
| 5,527,512 | 6/1996 | Bachtel et al. | 422/143 |

FIXED BED REACTOR ASSEMBLY HAVING A GUARD CATALYST BED

BACKGROUND OF THE INVENTION

1. Field of the Invention

The present invention broadly relates to a multistage fixed catalytic bed hydroprocessing reactor with separate catalyst addition and withdrawal systems for an upper or top stage having an essentially fixed catalyst bed.

More particularly, the present invention relates to a method and apparatus for hydroprocessing where two or more distinct, fixed catalytic beds are employed in a single onstream reactor for any hydroprocessing application, and where in the upper or top essentially fixed catalyst bed, catalyst particles are added and withdrawn as desired while the single onstream reactor is hydroprocessing a hydrocarbon feed stream in a downflow fashion. The present invention provides a method and a reactor which combines the advantages of a moving-bed reactor with the advantages of a fixed bed reactor within a single reactor. The upper or top essentially fixed catalyst bed functions as a guard catalyst bed for preferably removing organometallic matter in order that one or more subsequent fixed catalyst beds in communication with the upper or top essentially fixed catalyst bed (and in the same single onstream reactor containing the upper or top essentially fixed catalyst bed) may more efficiently perform their respective functions and have a longer catalyst life. The present invention also relates to a method for retrofitting an existing fixed bed reactor to produce a single reactor having the advantages of the present invention.

2. Description of the Prior Art

Hydroprocessing or hydrotreatment to remove undesirable components from hydrocarbon feed streams is a well known method of catalytically treating such heavy hydrocarbons to increase their commercial value. "Heavy" hydrocarbon liquid streams, and particularly reduced crude oils, petroleum residua, tar sand bitumen, shale oil or liquified coal or reclaimed oil, generally contain product contaminants, such as sulfur, and/or nitrogen, metals and organometallic compounds which tend to deactivate catalyst particles during contact by the feed stream and hydrogen under hydroprocessing conditions. Such hydroprocessing conditions are normally in the range of 212° F. to 1200° F. (100° to 650° C.) at pressures of from 20 to 300 atmospheres. Generally such hydroprocessing is in the presence of catalyst containing group VI or VIII metals such as platinum, molybdenum, tungsten, nickel, cobalt, etc., in combination with various other metallic element particles of alumina, silica, magnesia and so forth having a high surface to volume ratio. More specifically, catalyst utilized for hydrodemetallation, hydrodesulfurization, hydrodenitrification, hydrocracking etc., of heavy oils and the like are generally made up of a carrier or base material; such as alumina, silica, silica-alumina, or possibly, crystalline aluminosilicate, with one more promoter(s) or catalytically active metal(s) (or compound(s)) plus trace materials. Typical catalytically active metals utilized are cobalt, molybdenum, nickel and tungsten; however, other metals or compounds could be selected dependent on the application. Because these reactions must be carried out by contact of a hydrogen-containing gas with the hydrocarbon feed stream at elevated temperatures and pressures, the major costs of such processing are essentially investment in vessels and associated furnaces, heat exchangers, pumps, piping and valves capable of such service and the replacement cost of catalyst contaminated in such service. Commercial hydroprocessing of relatively low cost feed stocks such as reduced crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen and sulfur compounds, while carrying out the desired reactions, such as demetallation, denitrification, desulfurization, and cracking at elevated pressure and temperatures. Pumps, piping and valves for handling fluid streams containing hydrogen at such pressures and temperatures are also costly, because at such pressures seals must remain hydrogen impervious over extended service periods of many months. It is also cost-intensive to insure that all additional reactor vessels (e.g. fixed bed reactors, etc.) are obtained in order to catalytically process hydrocarbon feed streams from an initial reactor vessel where certain catalytic hydroprocessing (e.g. hydrodemetallation) is/are to be performed to one or more other reactor vessel(s) where additional catalytic hydroprocessing (e.g. hydrodenitrification) is/are to be performed.

Further, hydroprocessing catalyst for such one or more reactor vessel(s), which typically contains catalytically active metals such as titanium, cobalt, nickel, tungsten, molybdenum, etc., may involve a catalyst inventory of 500,000 pounds or more at a cost of $2 to $4/lb. Accordingly, for economic feasibility in commercial operations, the process must handle high flow rates and the one or more reactor vessel(s) should be filled with as much catalyst inventory as possible to maximize catalyst activity and run length. Additionally, the down-time for replacement or renewal of catalyst must be as short as possible. Further, the economics of the process will generally depend upon the versatility of the system to handle feed streams of varying amounts of contaminants such as sulfur, nitrogen, metals and/or organic-metallic compounds, such as those found in a wide variety of the more plentiful (and hence cheaper) reduced crude oils, residua, or liquified coal, tar sand bitumen or shale oils, as well as used oils, and the like.

The following three acceptable reactor technologies are currently available to the industry for hydrogen upgrading of "heavy" hydrocarbon liquid streams: (i) fixed bed reactor systems; (ii) ebullated or expanded type reactor systems which are capable of onstream catalyst replacement and are presently known to industry under the trademarks H-Oil$^R$ and LC-Fining$^R$; and (iii) the substantially packed-bed type reactor system having an onstream catalyst replacement system, as more particularly described in U.S. Pat. No. 5,076,908 to Stangeland et al, having a common assignee with the current inventions and discoveries.

A fixed bed reactor system may be defined as a reactor system having one or more reaction zone(s) of stationary catalyst, through which feed streams of liquid hydrocarbon and hydrogen flow downwardly and concurrently with respect to each other.

An ebullated or expanded bed reactor system may be defined as a reactor system having an upflow type single reaction zone reactor containing catalyst in random motion in an expanded catalytic bed state, typically expanded from 10% by volume to about 35% or more by volume above a "slumped" catalyst bed condition (e.g. non-expanded or non-ebullated state).

As particularly described in U.S. Pat. No. 5,076,908 to Stangeland et al, the substantially packed-bed type reactor system is an upflow type reactor system including multiple reaction zones of packed catalyst particles having little or no movement during normal operating conditions of no catalyst addition or withdrawal. In the substantially packed-bed type reactor system of Stangeland et al., when catalyst is withdrawn from the reactor during normal catalyst replacement, the catalyst flows in a downwardly direction under essentially plug flow or in an essentially plug flow fashion, with a minimum of mixing with catalyst in layers which are adjacent either above or below the catalyst layer under observation.

Of the three acceptable reactor systems, most hydroconversion reactor systems presently in operation on a worldwide basis are fixed bed reactors wherein a liquid hydrocarbon feed and a hydrogen stream flow concurrently through the catalyst beds in a downward flow path. While these fixed bed downflow type processes assure maximum density or volume of catalyst within a reaction zone without expansion of the bed, they are limited by the tendency of the catalyst to form local deposits of feed metals and other contaminates, particularly in the top catalyst bed (i.e. first reaction zone), affecting distribution and reaction rates. As a reactor average temperatures are progressively increased to maintain processing objectives under conditions of increasing local metal deposits, catalyst deactivation due to carbon deposition accelerates. When processing objectives can no longer be maintained due to catalyst deactivation (i.e. normally recognized as "End of Run" conditions), the reactor system must be taken offstream for catalyst regeneration or replacement.

It is known to use a series of individual reactor vessels stacked one above the other, with fluid flow either cocurrent or counterflow to catalyst. In such a process, catalyst moves by gravity from the upper vessel to a lower vessel by periodically shutting off, or closing, valves between the individual vessels. In a counterflow system, this permits removal of catalyst from the lowermost or first stage vessel, where the most contaminated, or raw, feed stock, originally contacts the catalyst. In this way, most of the major contaminating components in the hydrocarbon stream are removed before the hydrocarbon material reaches major conversion steps of the process performed in higher vessels of the stacked series. Thus, most of the deactivating components of the feed stream are removed before it reaches the least contaminated catalyst added to the topmost vessel. However, such systems require valves suitable for closing off catalyst flow against catalyst trapped in the line. Hence, valve life is relatively short and down-time for replacement or repair of the valves is relatively costly. Also, such series of individual reactor vessels are costly since each respective reactor vessel must be purchased separately.

It is also known that contaminants (e.g. metals, subterranean particulates, and organometallic components) are frequently removed from hydrotreater feeds, particularly those boiling above 800E F, by a layer of guard bed catalyst, added atop one or more layers of hydrotreating catalyst. The guard bed catalyst may be relatively inert, removing contaminant particles by trapping them. Alternatively, the guard material may have catalytic activity, removing contaminants such as organometallic feed components by causing them to deposit on the guard catalyst surfaces. Since guard bed catalysts are designed specifically to handle the contaminants, they help to prolong the life of the hydrotreating catalyst and require fewer total catalyst changeouts. However, even changing out the guard bed catalyst in a convention reactor requires a complete reactor system shutdown.

The following prior art does not disclose or suggest two or more distinct, fixed bed catalyst in a single onstream reactor, with the upper or top catalyst bed functioning as a guard bed catalyst that may be replaced without requiring a shutdown:

Jacquin et al. U.S. Pat. No. 4,312,741, is directed toward a method of on-stream catalyst replacement in a hydroprocessing system by controlling the feed of hydrogen gas at one or more levels. Catalyst, as an ebullated bed counterflows through the reactor but is slowed at each of several levels by horizontally constricted areas which increase the hydrogen and hydrocarbon flow rates to sufficiently locally slow downward flow of catalyst. While local recycling thus occurs at each such stage, rapid through-flow of fresh catalyst, with resultant mixing with deactivated or contaminated catalyst, is suppressed. The ebullating bed aids simple gravity withdrawal of catalyst from the vessel. Improvement of the disclosed system over multiple vessels with valves between stages is suggested to avoid the risk of rapid wear and deterioration of valve seals by catalyst abrasion.

Kodera et al. U.S. Pat. No. 3,716,478, discloses low linear velocity of a mixed feed of liquid and $H_2$ gas to avoid expansion (or contraction) of catalyst bed. By low linear velocity of fluid upflow, gas bubbles are controlled by flow through the packed bed, but the bed is fluidized by forming the bottom with a small cross-sectional area adjacent the withdrawal tube. This assists discharge of catalyst without backmixing of contaminated catalyst with fresh catalyst at the top of the single vessel. The range of the bed level in the vessel is from 0.9 to 1.1 of the allowable bed volume ("10%") due to fluid flow through the bed. A particular limitation of the system is that flow of the fluids undergoing catalytic reaction is restricted to a rate that will not exceed such limits, but must be adequate to ebullate the bed adjacent the catalyst withdrawal tube. Alternatively, injection of auxiliary fluid from a slidable pipe section is required. The patentees particularly specify that the diameter of the lower end of the vessel is smaller to increase turbulence and ebullation of catalyst adjacent the inlet to the catalyst withdrawal line. Fluidization of catalyst is accordingly indicated to be essential to the process. However the disclosed gas flow rates are well below commercial flow rates and there is no suggestion of temperatures or pressures used in the tests or the size, density or shape of the catalyst.

Bischoff et al, U.S. Pat. No. 4,571,326, is directed to apparatus for withdrawing catalyst through the center of a catalyst bed counterflowing to a liquid hydrocarbon and gas feed stream. The system is particularly directed to arrangements for assuring uniform distribution of hydrogen gas with the liquid feed across the cross-sectional area of the bed. Such uniform distribution appears to be created because the bed is ebullating under the disclosed conditions of flow. Accordingly, considerable reactor space is used to initially mix the gas and hydrocarbon liquid feeds in the lower end of the vessel before flowing to other bottom feed distributors. The feeds are further mixed at a higher level by such distributor means in the form of "Sulzer Plates" or a "honeycomb" of hexagonal tubes beneath a truncated, conical, or pyramidal-shaped funnel screen. The arrangement may include an open ramp area parallel to the underside of the screen between the tube or plate ends. Further, to maintain gas distribution along the length of the catalyst bed, quench gas is supplied through upflowing jets in star-shaped or annular headers extending across middle portions of the vessel. The arrangement for withdrawal of spent catalyst requires ebullation of at least the lower portion of the bed. As noted above, added vessel space for uniform mixing of hydrogen and feed before introducing the fluids into an ebullated bed, as well as an ebullating bed, increases the required size of the hydroprocessing vessel, increases catalyst attrition, increases catalyst bed mixing and substantially increases initial, and continuing operating costs of the system.

Bischoff et al. U.S. Pat. No. 4,639,354, more fully describes a method of hydroprocessing, similar to U.S. Pat. No. 4,571,326, wherein similar apparatus obtains uniform ebullation through the vertical height of a catalyst bed, including a quench gas step.

Meaux U.S. Pat. No. 3,336,217, is particularly directed to a catalyst withdrawal method from an ebullating bed reactor. In the system, catalyst accumulating at the bottom of a vessel and supported on a flat bubble-tray may be withdrawn through an inverted J-tube having a particular ratio of the volume of the short leg of the J-tube to the longer leg. The diameter of the J-tube is suited only to flow of catalyst from a body of catalyst ebullated by the upflowing hydrocarbon feed and gas.

U.S. Pat. Nos. 4,444,653 and 4,392,943, both to Euzen, et al., disclose removal systems for catalyst replacement in an ebullating bed. In these patents, the fluid charge including hydrocarbon containing gas is introduced by various arrangements of downwardly directed jets acting laterally against or directly onto the conical upper surface of the bed support screen or screens. Alternatively, the feed is introduced through a conical screen after passing through a distributor arrangement of tortuous paths or a multiplicity of separate tubes to mix the gas and liquid feed over the conical screen. Such arrangements use a considerable volume of the pressure vessel to assure such mixing.

U.S. Pat. Nos. 3,730,880 and 3,880,569, both to Van der Toorn, et al., disclose a series of catalytic reactors wherein catalyst moves downwardly by gravity from vessel to vessel through check valves. As noted above, such valves require opening and closing to regulate the rate of flow, or to start and stop catalyst transfer, with catalyst in the valve flow path. Feed of process fluids is either cocurrent or countercurrent through the catalyst bed.

Van ZijllLanghaut et al. U.S. Pat. No. 4,259,294, is directed to a system for on-stream catalyst replacement by entrainment of the catalyst in oil pumped as a slurry either to withdraw catalyst from or to supply fresh catalyst to, a reactor vessel. Reacting feed is suggested to be either cocurrent or countercurrent with catalyst flow through the reactor. Valves capable of closing with catalyst in the line, or after back-flow of slurry oil, are required to seal off the catalyst containing vessel at operating temperatures and pressures from the receiving reactor vessel, or isolate the catalyst receiving lock hopper from the withdrawal section of the vessel.

Carson U.S. Pat. No. 3,470,900, and Sikama U.S. Pat. No. 4,167,474, respectively illustrate multiple single bed reactors and multi-bed reactors in which catalyst is replaced either continuously or periodically. The feed and catalyst flow cocurrently and/or radially. Catalyst is regenerated and returned to the reactor, or disposed of. No catalyst withdrawal system is disclosed apart from either the configuration of the internal bed support or the shape of the vessel bottom to assist gravity discharge of catalyst.

U.S. Patent No. 3,966,420 to Pegels et al, describes a desulfurization reactor containing at least one tray and catalyst support for one or more catalyst beds, in which the conically shaped support is permeable to fluid and impermeable to catalyst particles. Catalyst may flow through an aperture in the support. A tray located beneath the support is also permeable to fluid and impermeable to catalyst particles. The disclosure allows for more than one tray and support assembly. The tray prevents catalyst particles during loading and unloading from plugging the underside of the support. The acute angle formed by the descriptive line of the conical support surface and the axis of the reactor is taught to be preferable between 35E and 45E. U.S. Pat. No. 4,502,946 to Pronk describes a process for the complete replacement of catalyst from a reactor vessel. The catalyst is removed through a valve which is preferably a rotary valve.

U.S. Pat. No. 4,590,045 to van der Wal, et al. describes a process for preventing catalyst fines from plugging the screen through which products pass within the reactor. U.S. Pat. No. 5,270,018 to Scheuerman describes an inverted J-tube for withdrawing spent catalyst from the bottom of a catalyst bed of a reactor vessel. To remove catalyst from the non-fluidized catalyst bed, the catalyst around the inlet of the J-tube is fluidized sufficiently to initiate and maintain direct transport of catalyst from the reactor vessel.

The method and reactor disclosed by Stangeland et al in U.S. Pat. No. 5,076,908, as well as the method(s) and reactor(s) taught by the above-identified prior art patents relating to U.S. Pat. No. 5,076,908 to Stangeland et al, all suggest that additional reactor vessels are needed to further process hydrocarbon products produced by a reactor vessel containing a single catalyst bed and/or if a single reactor contains two or more fixed catalyst beds, then the single reactor would have to be regularly shut down to replace the fixed catalyst beds. If two or more catalyst beds are needed and they are not to be mixed together, then two or more separate reactors placed in series are required. Separate reactors for separate purposes are expensive. Therefore, what is needed and what has been invented is a method and a reactor that is capable of containing two or more separate and distinct fixed catalyst beds, wherein the upper or top essentially fixed catalyst bed functions as a demetallation guard catalyst bed to remove contaminants (e.g. organometallic components) from a hydrocarbon feed stream before the hydrocarbon feed stream is further hydroprocessed through at least one additional fixed catalyst bed.

SUMMARY OF THE INVENTION

The present invention accomplishes its desired objects by broadly providing a down-flow fixed bed reactor assembly comprising a reactor vessel having a reactor wall including an internal cylindrical wall; and a catalyst bed support means coupled to and supported by the internal cylindrical wall of the reactor wall of the reactor vessel for supporting an essentially fixed catalyst bed in an upper hydroconversion reaction zone and for allowing a hydrocarbon feed stream to pass therethrough while preventing catalyst particles from an essentially fixed catalyst bed to exit therethrough. More specifically, the catalyst bed support means allows an initially treated hydrocarbon feed stream from an essentially fixed catalyst bed to pass therethrough while preventing catalyst particles from the same essentially fixed catalyst bed to pass therethrough. A container means is disposed in proximity to the catalyst bed support means for assisting in slurrying generally spent catalyst particles from an essentially fixed catalyst bed in the upper hydroconversion reaction zone above the catalyst bed support means. A hydrocarbon conduit means passes through the reactor wall of the reactor vessel and communicates with the container means for introducing a hydrocarbon into the container means for assisting in slurrying generally spent catalyst particles from an essentially fixed catalyst bed in the upper hydroconversion reaction zone of the reactor vessel. A catalyst outlet means passes through the reactor wall of the reactor vessel and communicates with the container means for withdrawing a generally spent catalyst particles in slurry form from a lower part of an essentially fixed catalyst bed in the upper hydroconversion reaction zone in the reactor vessel. At least one lower hydroconversion reaction zone is serially disposed in the reactor vessel under the catalyst bed support means for containing at least one fixed catalyst bed.

The down-flow fixed bed reactor assembly of the present invention additionally comprises an essentially fixed catalyst bed supported by the catalyst bed support means and having a first physical and/or catalytic properties, and at least one fixed catalyst bed disposed in the at least one lower hydroconversion reaction zone and having a second physical and/or catalytic properties. The first physical and/or catalytic properties may differ from or be essentially the same as the second physical and/or catalytic properties. The container means is preferably a generally conical shaped member and has an open container top wherethrough the hydrocarbon conduit means and the catalyst outlet means pass. The open container top has a container top diameter, and the catalyst outlet means has a catalyst outlet diameter that is less than the container top diameter. Preferably, the container top diameter is greater than five (5) times the catalyst outlet diameter. The container means also has a sloping container side that defines a container side angle with respect to a horizontal plane. The container side angle is greater than an angle of repose with respect to a horizontal plane of catalyst particles in the essentially fixed catalyst bed supported by the catalyst bed support means. A plurality of inert pellets may be disposed in a reactor vessel such as to be supported by the catalyst bed support means. At least one brace member may be connected to the container means and to the internal cylindrical wall for coupling the container means to the internal cylindrical wall of the reactor vessel.

The present invention further accomplishes its desired by broadly providing a method for hydroprocessing a hydrocarbon feed stream comprising the steps of:

(a) disposing a fixed catalyst bed in a lower hydroconversion reaction zone of a reactor vessel;

(b) disposing an essentially fixed catalyst bed in an upper hydroconversion reaction zone of the reactor vessel of step (a);

(c) downflowing, preferably for demetallizing purposes, through the essentially fixed catalyst bed in the upper hydroconversion reaction zone a hydrocarbon feed stream to produce an initially-treated hydrocarbon feed stream;

(d) slurrying catalyst particles from the essentially fixed catalyst bed to produce a slurried catalytic mixture;

(e) withdrawing the slurried catalytic mixture from the reactor vessel; and (f) downflowing, preferably for hydrotreating purposes, the initially-treated hydrocarbon feed stream of step (c) through the fixed catalyst bed in the lower hydroconversion reaction zone of step (a) to produce a treated hydrocarbon feed stream.

The slurrying step (d) comprises introducing a catalyst-carrier hydrocarbon into a container consisting of catalyst particles from the essentially fixed catalyst bed which are to be slurried; and the introducing of the catalyst-carrier hydrocarbon preferably comprises passing the catalyst-carrier hydrocarbon through a first conduit means communicating with the container and passing through a reactor wall of the reactor vessel. The withdrawing step (e) above preferably comprises removing the slurried catalytic mixture from the container through a second conduit means communicating with the container and passing through the reactor wall of the reactor vessel.

The method for hydroprocessing a hydrocarbon feed stream additionally includes adding fresh catalyst to the essentially fixed catalyst bed. The withdrawing step (e) above more particularly includes withdrawing at least partially spent catalyst from the essentially fixed catalyst bed simultaneously with the downflowing step (c); and the adding of fresh catalyst to the essentially fixed catalyst bed is preferably simultaneously with the downflowing step (c). The downflowing step (f) comprises flowing the initially-treated hydrocarbon feed stream through the fixed catalyst bed without the initially-treated hydrocarbon feed stream having left or exited the reactor vessel. A plurality of inert pellets may be disposed in the upper hydroconversion reactor zone.

The present invention also further accomplishes its desired objects by broadly providing a method for retrofitting a hydroprocessing fixed bed reactor assembly comprising the steps of:

(a) providing a hydroprocessing reactor vessel comprising a reactor wall with an internal cylindrical wall, a first catalyst bed support member coupled to and supported by the internal cylindrical wall of the hydroprocessing reactor vessel, a second catalyst bed support member coupled to and supported by the internal cylindrical wall of the hydroprocessing reactor vessel, and a fixed catalyst bed disposed on the first catalyst bed support member;

(b) removing the fixed catalyst bed of step (a) from the hydroprocessing reactor vessel;

(c) disposing a container in the hydroprocessing reactor vessel above the first catalyst bed support member;

(d) passing a hydrocarbon-carrier conduit through the reactor wall such as to communicate with the container of step (c);

(e) passing a catalyst withdrawal conduit through the reactor wall such as to communicate with the container of step (c); and (f) passing a catalyst addition conduit through the reactor wall.

It is therefore an object of the present invention to provide a downflow fixed bed reactor assembly.

It is another object of the present invention to provide a method for hydroprocessing a hydrocarbon feed stream.

It is yet another object of the present invention to provide a method for retrofitting a hydroprocessing fixed bed reactor assembly.

These, together with the various ancillary objects and features which will become apparent to those skilled in the art as the following description proceeds, are attained by this invention, a preferred embodiment as shown with reference to the accompanying drawings, by way of example only, wherein:

DETAILED DESCRIPTION OF THE INVENTION

Figure 1:
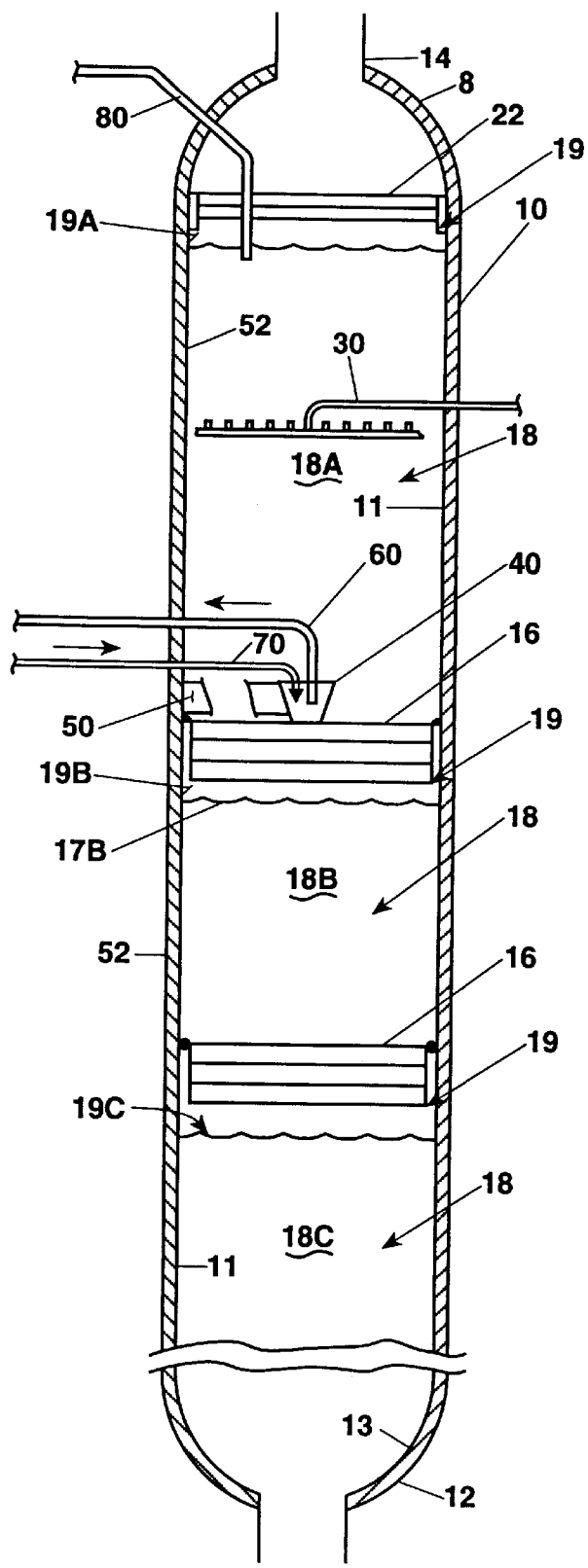
FIG. 1 is a partial vertical sectional view of a fixed-bed reactor assembly having a guard catalyst bed in the upper or top portion of the fixed-bed reactor assembly and at least one fixed catalyst bed in the lower or bottom portion of the fixed-bed reactor assembly, and including a truncated cone-shaped container located in a lowermost part of the guard catalyst bed for assisting in liquifying or slurrying catalyst particles from the guard catalyst bed.

Including Preferred and/or Best Mode Embodiments of the Invention

Referring in detail now to the drawings wherein similar parts of the invention are identified by like reference numerals, there is seen a reactor vessel, generally illustrated as 10. Reactor vessel 10 includes a generally cylindrical reactor wall 52 having an internal generally cylindrical wall 11, a top domed closure 8 bound to the reactor wall 52, and a bottom domed closure 12 also bound to the reactor wall 52 while having a surface 13. The reactor vessel 10 is designed to react a hydrogen-containing gas mixed with a liquid hydrocarbon stream at a pressure of up to about 300 atmospheres (about 4500 lbs. per square inch) and up to about 650° C. (about 1200° F.). For such reaction, hydrogen-containing gas and liquid hydrocarbon stream are preferably premixed and introduced as a single hydrocarbon feed stream (i.e. a single two-phase flow) through the top domed closure 8 of the reactor vessel 10 by a conduit 14 secured coaxially thereto such as to have a concentric disposition with respect to the reactor vessel 10. Thus, the hydrocarbon feed stream which is to be treated enters the reactor vessel through conduit 14. Treated hydrocarbon products exit the reactor vessel 10 through a conduit 9 secured coaxially to the bottom domed closure 12.

The reactor vessel 10 contains two or more catalyst bed support means, generally illustrated as 16, for supporting two or more catalyst beds 18 in two or more hydroconversion reaction zones 19. The two or more catalyst beds 18 of the present invention consists of an upper or top essentially fixed catalyst bed 18A and one or more lower or bottom fixed catalyst beds 18B, and 18C, all serially disposed within the reactor vessel 10 such that an initially treated hydrocarbon feed stream may freely flow through the respective catalyst bed support means 16 from the upper or top essentially fixed catalyst bed 18A to the lower fixed catalyst bed 18B, from the lower fixed catalyst bed 18B to the lower fixed catalyst bed 18C, and so forth, without leaving the reactor vessel 10. The meaning of the term "essentially fixed" is set forth below. The upper or top essentially fixed catalyst bed 18A and the lower or bottom fixed catalyst beds 18B and 18C are disposed in and, are contained within an upper or top hydroconversion reaction zone 19A and within lower or bottom hydroconversion reaction zones 19B and 19C, respectively. The catalyst levels of lower or bottom fixed catalyst beds 18B and 18C are 17B and 17C respectively.

The catalyst bed support means 16 contained in the reactor vessel 10 contain appropriate openings (not shown) well known to the artisans in the art and may be of any suitable geometric shape for employment in a fixed bed hydroprocessing reactor, such as reactor vessel 10. The catalyst bed support means 16 further may be of any type that preferably insures even and equal distribution of an initially treated hydrocarbon feed stream across a full cross-sectional area of one of the lower catalyst bed 18B and 18C; for example, across a full cross-sectional area of lower catalyst bed 18B after leaving the upper essentially fixed catalyst bed 18A. Thus, the particular geometric shape or type of each of the catalyst bed support means 16 is not to unduly limit the spirit and scope of the present invention.

To assure maximum catalytic benefit during the hydroprocessing of the hydrocarbon feed stream, it is preferred that each of the hydroconversion reaction zones 19 (i.e. 19A, 19B, and 19C) in the reactor vessel 10 contain as much catalyst as possible within the design volume of the reactor vessel 10. Accordingly, it is preferred that the each of catalyst bed support means 16 for each of the catalyst beds 18 be placed as low as possible in each of the hydroconversion reaction zones 19 in the reactor vessel 10 while assuring full and adequate dispersion of the hydrogen-containing gas within the liquid hydrocarbon stream, both of which make up the hydrocarbon feed stream.

The reactor vessel 10 also contains a generally (grid-like structure) circular plate member 22 (i.e. a distributor tray), that is secured to the internal generally cylindrical wall 11 for distributing the mixture of the liquid hydrocarbon stream and hydrogen-container gas evenly into the upper or top essentially fixed catalyst bed. Therefore, after a hydrocarbon feed stream passes through conduit 14 and enters the reactor vessel 10, it lodges on the distributor tray or circular plate member 22 where its grid-like structure evenly distributes the hydrocarbon feed stream into upper or top essentially fixed catalyst bed 18A for trickling downwardly therethrough.

A quench assembly, generally illustrated as 30 (see FIG. 1), may be conveniently disposed as desired in any of the catalyst beds 18 for introduction of a quenching matter (e.g. a quench gas and/or a quench liquid) at one or more intermediate levels in the reactor vessel 10. The quench assembly 30 may be any suitable assembly that is capable of quenching the catalyst beds 18, such as the quench assembly disclosed in U.S. Pat. No. 5,492,617 and commonly owned by the Assignee, or the quench assembly taught in U.S. Pat. No. 5,076,908 to Stangeland et al, also commonly owned by the Assignee.

At least one container or catalyst withdrawal sump, generally illustrated as 40, is disposed in close proximity to the uppermost catalyst bed support means 16 which is supporting the essentially fixed catalyst bed 18A. The container 40 assists in liquefying or slurrying generally spent catalyst particles from the essentially fixed catalyst bed 18A in the upper or top hydroconversion reaction zone 19A above the uppermost catalyst bed support means 16. A hydrocarbon-carrier conduit 70 passes through the reactor wall 52 of the reactor vessel 10 and communicates with the container 40 for introducing a hydrocarbon for also assisting in liquefying or slurrying generally spent catalyst particles from the essentially fixed catalyst bed 18A. A catalyst outlet means in the form of a catalyst withdrawal conduit 60 also passes through the reactor wall 52 of the reactor vessel 10 and also communicates with the container 40 for withdrawing generally spent catalyst particles after being liquified or slurryed in the container 40.

A catalyst addition conduit 80 passes through the top domed closure 8 for adding fresh catalyst particles 56 (see FIG. 4) into the upper or top hydroconversion reaction zone 19A in order to continue formulating the upper or top essentially fixed catalyst bed 18A. It is to be understood that whenever the specification or the claim(s) states, mentions, or implies "fresh catalyst", such stated, mentioned, or implied "fresh catalyst" means within the spirit and scope of the present invention any type of catalyst having any usable catalyst life or activity (e.g. regenerated catalyst, rejuvenated catalyst, partially fouled catalyst obtained from any source, etc.). Preferably, "fresh catalyst" means a type of catalyst that has never been used before and is obtained directly from a manufacturer with the lowest desired density and the highest desired catalyst life or activity.

The container 40 that is employed in the present invention for liquefying and/or slurrying generally spent catalyst particles from the essentially fixed catalyst bed 18A may be any suitable type of receptacle with any suitable geometric configuration that is capable of functioning for liquefying and/or slurrying generally spent catalyst particles. The container 40 may have an open bottom 42 (see FIG. 7) with the uppermost catalyst bed support means 16 (i.e. the catalyst bed support member that supports the essentially fixed catalyst bed 18A) supplying the bottom, or the container 40 may have a closed bottom 44 (see FIG. 8) which may be flat, rounded, etc. The container 40 may be solid, or any structural part of the container 40 may be perforated with upflowing perforations (not shown) to allow introduction of gases to initiate the flow of slurryed catalyst particles through catalyst withdrawal conduit 60.

Figure 5:
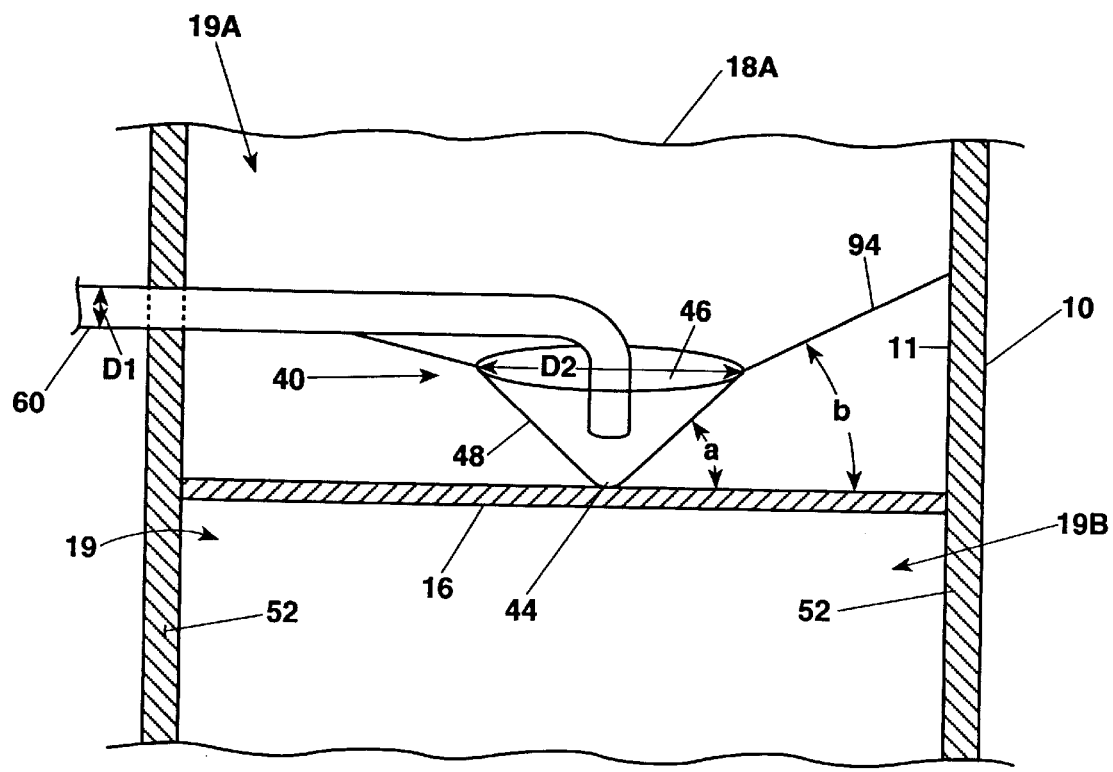
FIG. 5 discloses the generally truncated cone or container member in proximity to the catalyst bed support member and having the catalyst withdrawal conduit extending through the reactor wall and communicating with the generally truncated cone or container member.

In a preferred embodiment of the present invention the container 40 is a generally truncated conical or frustro-conical like sump with an open top 46 and slanted sides 48 which slant downwardly and inwardly (see FIG. 5) with respect to the open top 46, forming an acute angle a with respect to a horizontal plane (not shown) such as a plane along the uppermost catalyst bed support means 16. The value of the acute angle a may be of any suitable value, preferably having a value greater than angle b, defined as best shown in FIG. 5 by an angle of catalytic interfacial repose 94 with respect to a horizontal plane (not shown) such as a plane along the uppermost catalyst bed support means 16. As is well known to those artisans possessing the ordinary skill in the art, below the catalytic interfacial repose 94 would lie catalyst particles which would possess a high density and low catalyst life or activity. Thus, in order to save on the cost of catalyst, it would be advisable to dispose a plurality of inert pellets 90 (e.g. alumina pellets) below the catalytic interfacial repose 94 such as to be supported by the uppermost catalyst bed support means 16 while circumferentially surrounding the container 40. In those instances the plurality of inert pellets 90 (see FIG. 6) would be sized and dimensioned such as not to pass through the uppermost catalyst bed supports means 16; more specifically, sized and dimensioned such as not to pass through openings (not shown) in a permeable screen (not shown) supported by the uppermost catalyst bed support means 16.

Figure 6:
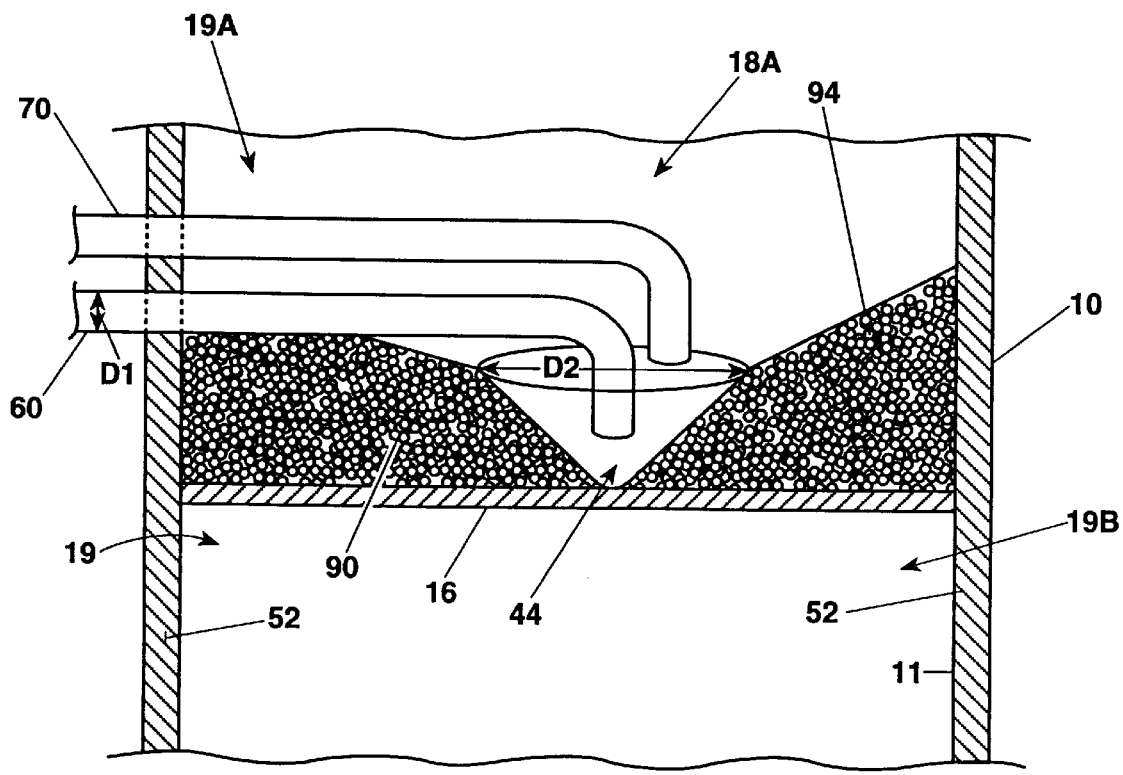
FIG. 6 discloses the generally truncated cone or container member of FIG. 5 with inert balls located between the angle of repose of the catalyst and the catalyst bed support member, and with the catalyst withdrawal conduit and the hydrocarbon carrier conduit both passing through the reactor wall and communicating with the insides of the generally truncated cone or container member.
Figure 7:
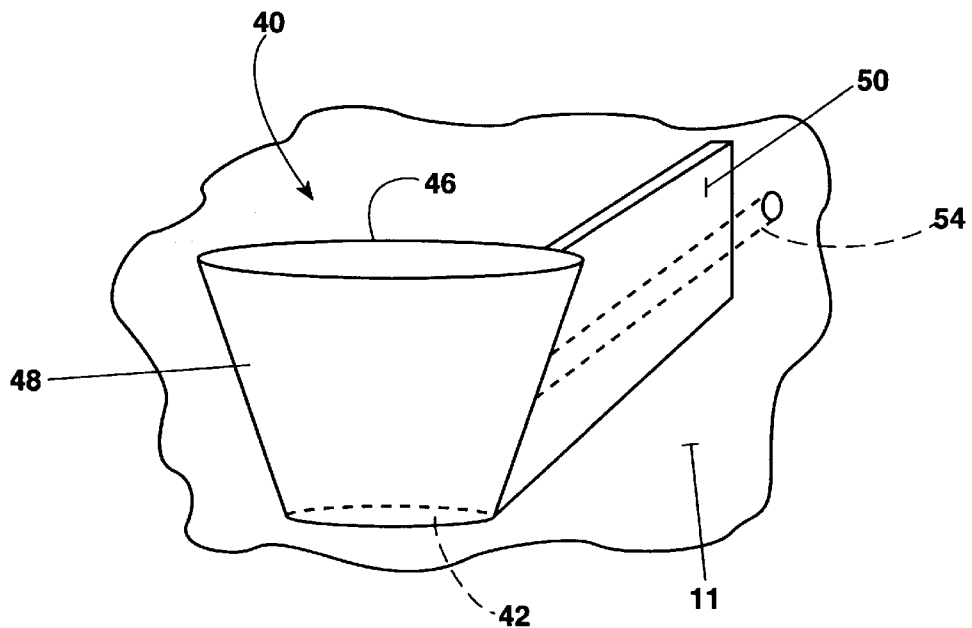
FIG. 7 is a partial perspective view of the generally truncated cone or container member and a brace member attached thereto and to the internal cylindrical wall of the reactor wall, with an optional feature of the brace member containing a conduit (represented as dotted lines) for carrying fluidizing hydrocarbon to the insides of the generally truncated cone or container member.
Figure 8:
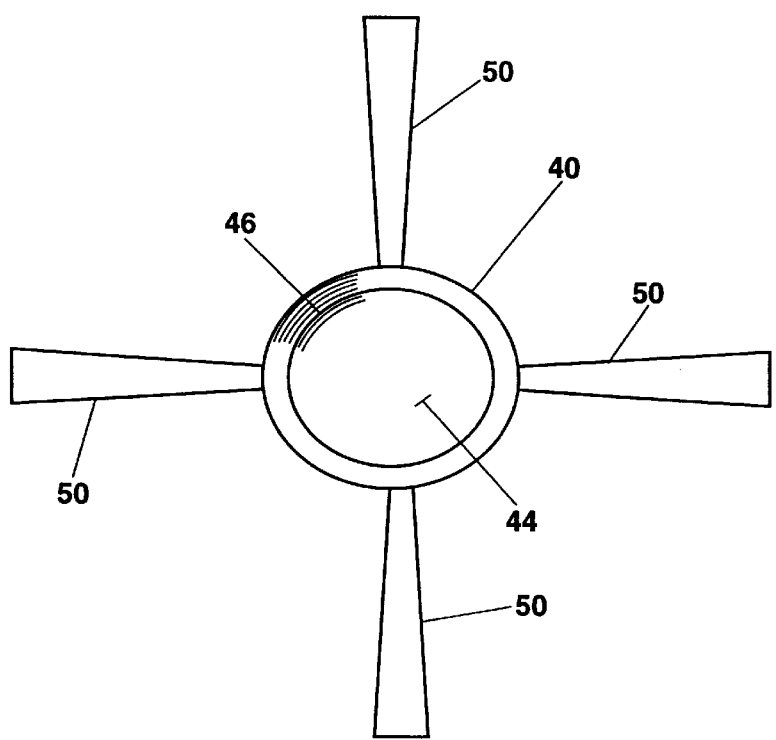
FIG. 8 is a top plan of the generally truncated cone or container member having four braces attached thereto for coupling the generally truncated cone or container member to the internal cylindrical wall of the reactor vessel.

The container 40 may be supported in its upright posture (as depicted in FIGS. 5 and 6) by any suitable means, such as by the braces or bars 50 shown in FIGS. 7 and 8. The bars 50 preferably attach at several positions along the sides 48 of the (preferably conical) container 40 as well as to the internal generally cylindrical wall 11 for coupling the container 40 to the reactor vessel 10. The bars 50 may extend from the container 40 in any suitable manner such as radially outwardly as shown in FIGS. 1 and 7, or upwardly or downwardly from the container 40. As best shown in FIG. 7, one or more of the bars 50 may include a pipe 54 for carrying fluidizing gas into the container 40 to assist the catalyst withdrawal conduit 60 in withdrawing generally spent catalyst particles from the container 40.

Alternatively, container 40 may be partially or fully integrated into the catalyst support means. In this embodiment, the uppermost edge of container 40 is positioned near the top surface of the catalyst support means, and container 40 extends downward into the catalyst support means. In some applications, the bottom of container 40 may extend downward below the catalyst support means.

The open top 46 and the catalyst withdrawal conduit 60 respectively have diameters D2 and D1. The diameters D2 and D1 may be sized and dimensioned as desired to facilitate the withdrawal of generally spent catalyst particles from the container 40. Preferably, the value of the D2 is greater than five (5) times the value of D1, with the extreme value of D2 beyond the value of D1 readily discernible by those skilled in the art given operating and economic confines. Likewise, the length of extension of catalyst withdrawal conduit 60 into the container 40, as well as the length of extension of the hydrocarbon-carrier conduit 70 into the container 40, are within the purview of the skilled artisans.

Figure 2:
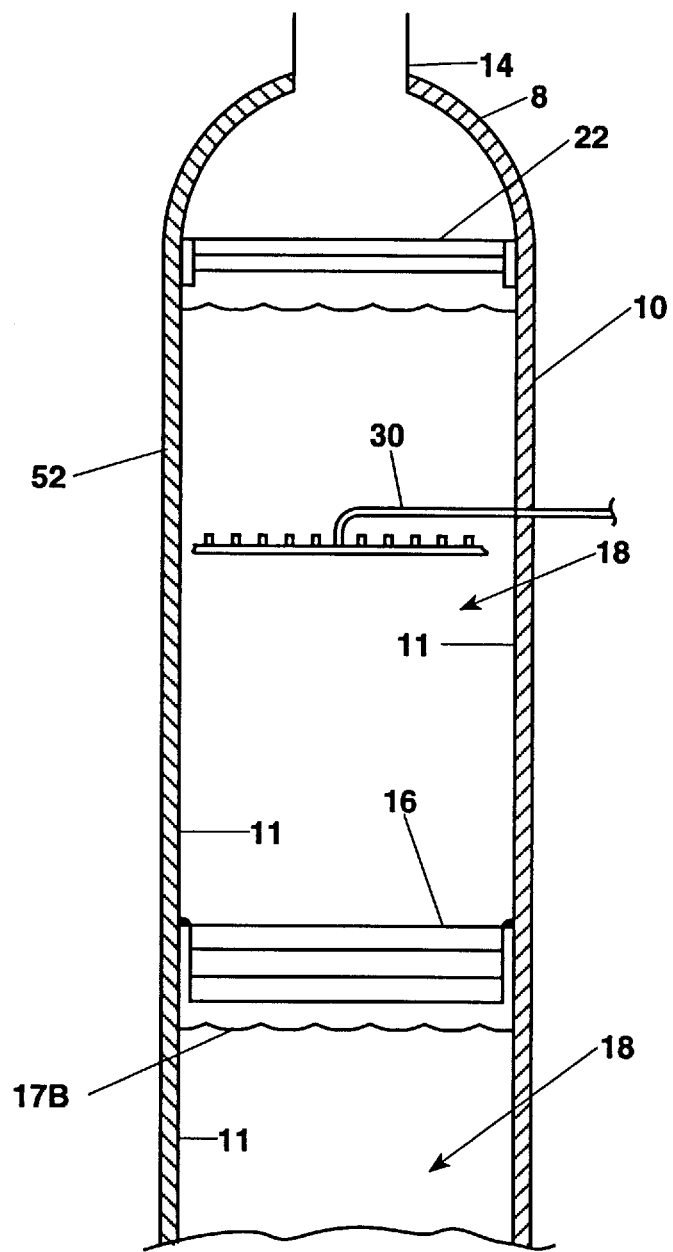
FIG. 2 is a partial vertical sectional view of a prior art reactor vessel having at least two fixed beds in series and before retrofitting the prior art reactor vessel with a catalyst guard bed.
Figure 3:
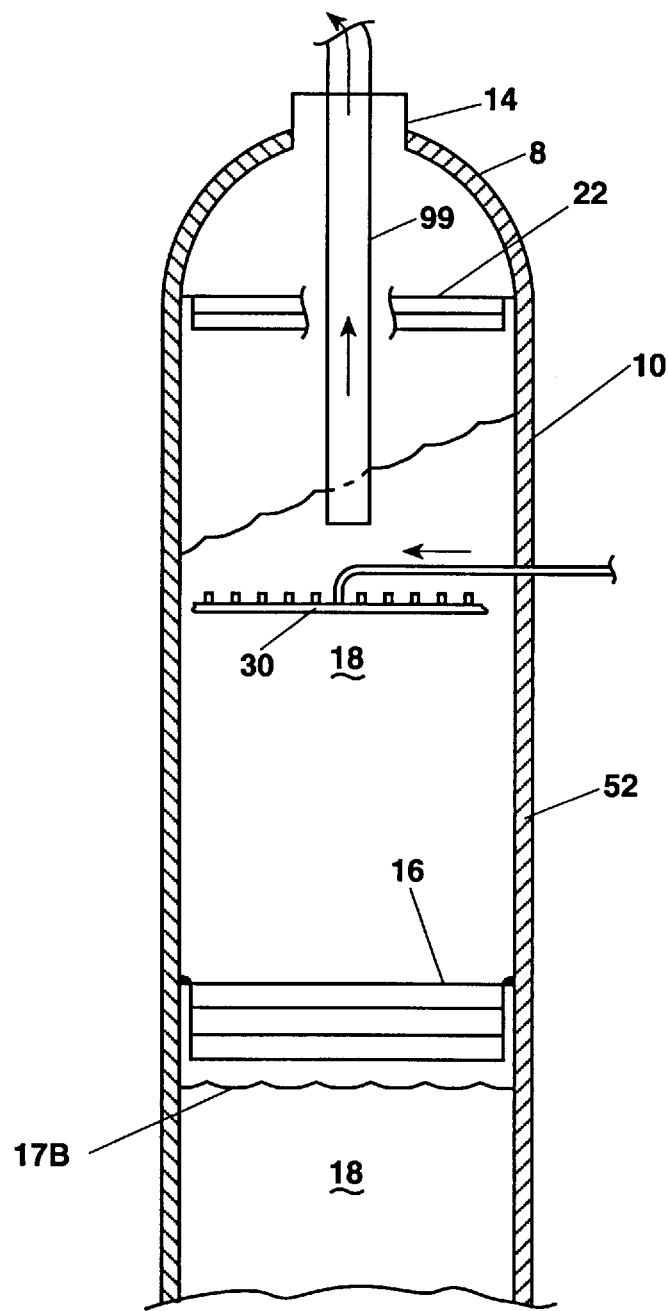
FIG. 3 is the partial vertical sectional view of the prior art reactor vessel in FIG. 2, but with the catalyst particles from the upper fixed catalyst bed being removed.

One of the salient features of the present invention is that a conventional fixed catalytic bed reactor vessel having at least two fixed catalyst beds 18 in superimposed series as best shown in FIG. 2, may be retrofitted to produce the features of the present invention. The retrofitting procedure is accomplished by initially removing the top fixed catalyst bed 18 from the reactor vessel 10. Such removing may be accomplished by inserting pipe 99 through the conduit 14 and into the reactor vessel 10 as again best shown in FIG. 3, and subsequently vacuuming-out the catalyst particles therefrom.

Figure 4:
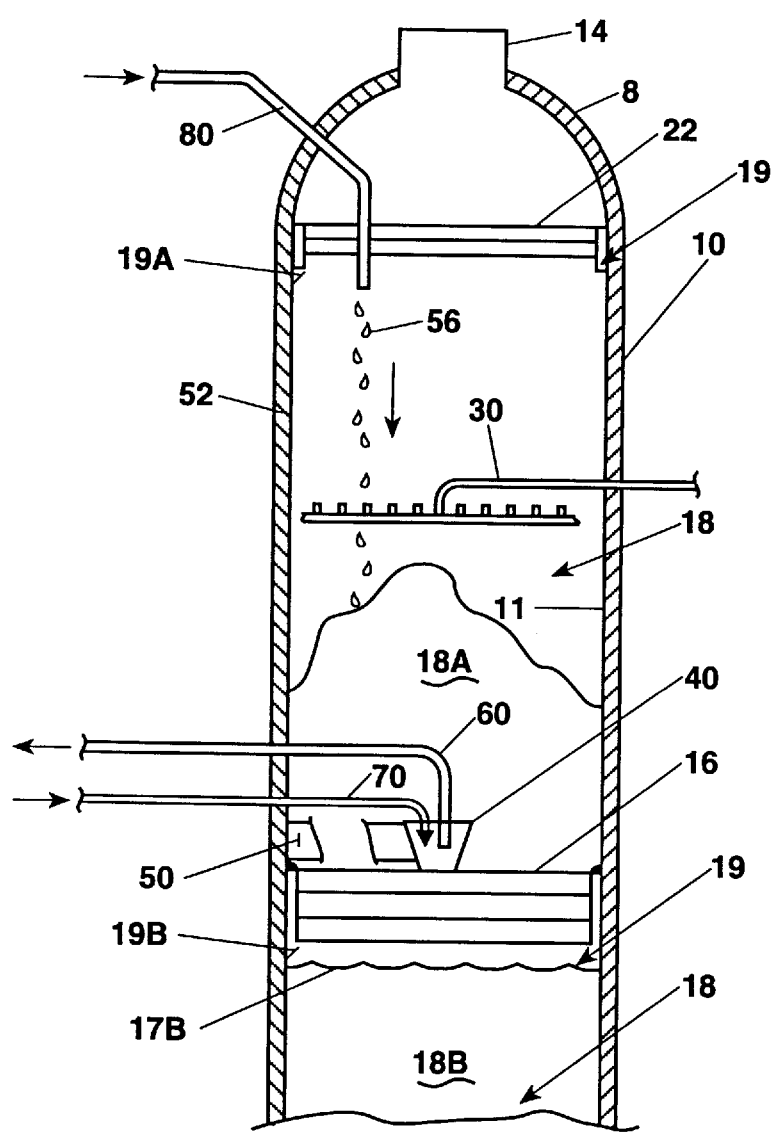
FIG. 4 is a partial vertical sectional view of the reactor vessel after having disposed therein: a generally truncated cone with a catalyst withdrawal conduit communicating therewith and passing through the reactor wall of the reactor vessel; a hydrocarbon carrier conduit also communicating with the generally truncated cone and passing through the reactor wall; a catalyst addition conduit passing through the reactor wall of the reactor vessel and depositing fresh catalyst into the upper or top portion of the fixed-bed reactor assembly to form the essentially fixed catalyst bed.

After the top fixed catalyst bed 18 has been removed from the reactor vessel 10, the container 40 and its associated bars 50 are all conveniently disposed within the upper or top hydroconversion reaction zone 19A such that the container 40 is in an upright position as illustrated in FIGS. 1 and 4, with the open top 46 facing upwardly and towards the top domed closure 8 of the reactor vessel 10. If desired, the plurality of inert pellets 90 may be circumferentially disposed around the container 40 and underneath the catalytic interfacial repose 94 as shown in FIG. 6. Subsequently, the catalyst withdrawal conduit 60 and the hydrocarbon-carrier conduit 70 are passed through the reactor wall 52 to project and extend through the open top 46 of the container 40. As previously indicated, the hydrocarbon-carrier conduit 70 carries and conducts a hydrocarbon (e.g. any suitable oil) into the container 40 to slurry and liquefy at least partly generally spent catalyst for removal through the catalyst withdrawal conduit 60.

The catalyst addition conduit 80 is also passed through the reactor wall 52, preferably through the top domed closure 8, in order that fresh catalyst particles 56 (see FIG. 4) may be introduced into the upper or top hydroconversion reaction zone 19A for formulating and/or initially producing the upper or top essentially fixed catalyst bed 18A. The catalyst addition conduit 80 also provides for the adding of fresh catalyst particles 56 into the upper or top essentially fixed catalyst bed 18A as make-up catalyst to replace the generally spent catalyst that is removed from the container 40 in slurry form through the catalyst withdrawal conduit 60. Preferably, at least partially spent catalyst is withdrawn through the catalyst withdrawal conduit 60 from the container 40 simultaneously with the downflowing and trickling-down of the hydrocarbon feed stream through the upper or top essentially fixed catalyst bed 18A. The fresh catalyst particles 56 are also preferably added through the catalyst addition conduit 80 and into the essentially fixed catalyst bed 18A simultaneously with the downflowing and trickling-down of the hydrocarbon feed stream through the upper or top essentially fixed catalyst bed 18A. After the hydrocarbon feed stream passes through the upper or top essentially fixed catalyst bed 18A, an initially-treated hydrocarbon feed stream is produced. The initially-treated hydrocarbon feed stream is subsequently flowed through the uppermost catalyst bed support means 16 and through the following lower or bottom fixed catalyst bed 18B to eventually produce a treated hydrocarbon feed stream, all without any initially-treated hydrocarbon feed stream having left or exited the reactor vessel 10.

Considering the range of hydroconversion systems and/or hydroconversion reaction zones which could benefit from the preferred embodiments of the present invention, one skilled in the art will appreciate the variety of catalysts, having a variety of physical properties and elemental compositions, which could be used in such a range of systems. It is within the spirit and scope of the present invention to encompass these systems employing catalysts having a size, shape and density which vary widely from system to system, such as extrudate type catalyst having various sizes and lengths. Therefore, it is not important for the present preferred embodiment that the catalyst particles be of uniform and/or same size, and shape (same density when in fresh catalyst state) within the hydroconversion reaction zone of 19A of the present hydroconversion system, in order to achieve the desired catalyst and hydrocarbon flow patterns within the hydroconversion reaction zone 19A.

An "essentially fixed catalyst bed" may be broadly defined as a substantially packed bed of catalyst, more specifically as a downwardly moving substantially packed bed of catalyst. By "moving bed" is meant a reaction zone configuration in which a catalyst is added at one end of a catalyst bed in an intermittent or substantially continuous manner and is withdrawn in close proximity to the other end in an intermittent or substantially continuous manner. When any type of catalyst or essentially fixed catalyst bed 18A movement is mentioned, stated, or implied, the spirit and scope of the present invention includes such type of movement on any type of basis or in any manner (e.g. "periodic", "fully continuous", "non-continuous" etc.) without the necessity of having to specifically mention the type of basis or manner. Preferably and as indicated, catalyst is added at the top of the hydroconversion reaction zone 19A and withdrawn from the container 40 at the bottom. In the type of moving bed to which the present preferred embodiment is directed, the catalyst particles in the bed 18A are substantially packed and move downwardly when at least partially spent catalyst is withdrawn from the container 40. It has essentially the character of a fixed bed except for a slight movement downwardly and for the addition and removal of catalyst.

Several advantages ensue from use of a downwardly moving substantially packed or the essentially fixed catalyst bed 18A. By establishing and maintaining appropriate gas and liquid velocities in packed fixed bed type reactors, the catalyst in the catalyst bed 18A will be allowed to migrate downward through the upper hydroconversion reactor zone 19A in the reactor vessel 10 in a predictable manner as catalyst batches are withdrawn from the container 40 through catalyst withdrawal conduit 60. And further, by maintaining catalyst movement downwardly within the upper hydroconversion reactor zone 19A in the vessel 10, the catalyst within the essentially fixed catalyst bed 18A functions as a guard catalyst bed to remove a majority of the contaminants (i.e. the organometallic contaminants) from the hydrocarbon feed stream before the hydrocarbon feed stream reaches the lower fixed catalyst beds 18B and 18C, thus extending the activity and life of the latter.

Intermittent or continuous catalyst additions and withdrawal may be used. Catalyst replacement rates can range from several percent of the charge per day to several percent of the charge per week, depending on the reactor size, catalyst metals loading capacity, feed rate, and feed composition and processing objectives. Fresh catalyst particles 56 are introduced into the upstream end of essentially fixed catalyst bed 18A, and a corresponding volume of deactivated catalyst is removed from the container 40 in the downstream end of the essentially fixed catalyst bed 18A, at a rate which is sufficient to maintain the actual overall average level of catalytic upgrading activity of the bed as a whole at or above the selected minimum average activity level. By "upstream" end of the essentially fixed catalyst bed 18A is meant the end of the moving but essentially fixed bed into which the heavy hydrocarbonaceous feed is introduced. By "downstream" end of the essentially fixed catalyst bed 18A is meant the end of the bed from which the process effluent (i.e. an initially treated hydrocarbon feed stream) leaves the essentially fixed catalyst bed 18A. In a normal gravity flow system, the catalyst and hydrocarbon feed stream are added at the top of the reactor vessel 10 (the upstream end), and spent catalyst and initially treated hydrocarbon feed stream are withdrawn from the bottom (the downstream end) of the upper hydrocarbon reaction zone 19A.

In a particularly important application of the present invention, catalyst is continuously added at the top of the reactor (e.g. reactor 10) to the slowly moving bed (e.g. essentially fixed bed 18A), and spent (and deactivated catalyst) catalyst is continuously withdrawn from the container 40 in the bottom of the slowly moving bed. The deactivated catalyst is removed from the reactor (e.g. reactor 10) after it has been deactivated to a substantially lower level of activity than an acceptable minimum average level of activity of the overall catalyst bed. This allows more efficient and complete use of the catalyst activity, e.g. its metals capacity, for such feed upgrading functions as demetallation. As previously indicated, spent (and deactivated) catalyst is withdrawn from the container 40 in a hydrocarbon liquid that has slurryed the spent (and deactivated) catalyst.

The product from the method of the present invention exits a reactor (e.g. reactor vessel 10) and is normally subjected to further conventional refinery processing. All or part of the product can be passed to an additional conventional, fixed bed upgrading operation, such as a hydrodesulfurization operation. Part of the product stream can be recycled, either for further catalytic treatment or as a diluent. Treatment of heavy feeds by catalytic demetallation according to the present process followed by fixed bed desulfurization is particularly effective, but all or part of a demetallized product from the cocurrent demetallation reaction zone (e.g. hydroconversion reaction zones 19A, 19B and 19C) can also be processed in a countercurrent moving bed or a cocurrent fixed bed desulfurization reaction zone.

The present preferred embodiments of the present invention are applicable to hydroconversion reaction zones for hydrocracking, hydrodemetallization, hydrotreating, hydrodesulfurization, hydrodenitrification, hydrofinishing and the like, all of which catalytically upgrade a heavy hydrocarbonaceous oil that represents the liquid hydrocarbon stream or liquid hydrocarbon feed stream. By "heavy" liquid hydrocarbon stream as used herein is meant liquid hydrocarbon stream at least 50 volume percent of which boils above about 204° C. and which preferably contains a substantial fraction boiling above about 343° C. and particularly preferably above about 510° C. Preferred liquid hydrocarbon streams are residual fractions and synthetic crudes. They can be derived from crude petroleum, from coal, from oil shale, from tar sand bitumen, from heavy tar oils, and from other synthetic sources. The present invention is advantageously employed to refine highly refractory and contaminated liquid hydrocarbon streams. The liquid hydrocarbon stream may be substantially free from finely divided solids such as shale fines, sand or the like. Alternatively, the liquid hydrocarbon stream may contain a substantial concentration (e.g. about 1 weight percent or more) of finely divided solids. As previously indicated, the liquid hydrocarbon stream is preferably premixed with any type of hydrogen-containing gas which is preferably hydrogen, before being introduced into the reactor vessel 10 via conduit 14 as a single stream or hydrocarbon stream. The mixing ratios of the liquid hydrocarbon stream to the hydrocarbon containing gas may be any suitable ratio, well known to those artisans possessing the ordinary skill in the art.

Typically, a heavy hydrocarbonaceous oil employed as a hydrocarbon feed stream in the present invention contains undesirable metals. Undesirable metals which are often present in hydrocarbonaceous feeds notably include nickel, vanadium, arsenic, calcium, and iron. These metals can quickly deactivate conventional, fixed bed catalysts (such as fixed bed hydroprocessing catalysts) and also rapidly and irreversibly deactivate catalysts when high metals level feed are charged directly to conventional units. These metals as previously indicated are often present as organometallic compounds. Thus, the use of the terminology "iron, nickel, arsenic, calcium, or vanadium compounds" means, those metals in any state in which they may be present in the hydrocarbon feed stream in the process of the present invention, either as metal particles, inorganic metal compounds, or an organo-metallic compounds. The object is for the essentially fixed catalyst bed 18A (i.e. a guard catalyst bed) to remove from a hydrocarbon feed stream a majority of the organometallic contaminants before the hydrocarbon feed stream reaches the lower or bottom fixed catalyst beds 18B and 18C in order to extend the catalytic life of the fixed catalyst beds 18B and 18C and to keep the reactor vessel 10 onstream (without a shutdown) a longer period of time. For maximum efficiency in such a cocurrent demetallation process, the hydrocarbon feed stream should have levels of undesirable metals greater than about 150 ppm by weight of the hydrocarbon feed stream, preferably greater than about 200 ppm by weight of the hydrocarbon feed stream, and more preferably greater than about 400 ppm by weight. Although nickel, vanadium, arsenic, calcium, and iron are the usual metal contaminants, other undesired metals, such as sodium, may also contribute to the metals content of the hydrocarbon feed stream for purposes of catalytic demetallation upgrading processing.

Catalytic upgrading conditions (e.g. catalytic demetallation and/or desulfurization conditions, catalytic hydrogenation conditions such as designed for asphaltenes saturation, catalytic denitrification conditions and catalytic hydrocracking conditions, etc.) employed in the hydroconversions reaction zones (i.e. zones 19A, 19B and 19C) within the reactor vessel 10 for preferred embodiments of the present invention all include a reaction temperature generally in the range of from about 230° C. to about 480° C., a pressure generally in the range of from about 30 to about 300 atmospheres, a hydrogen rate ranging from about 1000 to about 10,000 standard cubic feet per barrel of feed, and a liquid hourly space velocity (LHSV) in the range of from about 0.20 hr$^{-1}$ to about 10 hr$^{-1}$. For feed demetallation upgrading, the temperatures and pressures within the reaction zone can be those typical for conventional demetallation processing. The pressure is typically above about 500 psig (514.7 psia; 35.5 bar). The temperature is typically greater than about 315° C., and preferably above 371° C. Generally, the higher the temperature, the faster the metals are removed; but the higher the temperature, the less efficiently the metals loading capacity of the demetallation catalyst is used. While demetallation reaction can be conducted in the absence of added hydrogen, hydrogen is generally used and therefore requires full and equal distribution into the beds (i.e. beds 18A, 18B, and 18C) along with any gases evolving from the feed.

In carrying out a process of the preferred embodiments of the present invention, a minimum average level of catalytic feed upgrading activity for the cocurrently moving catalyst bed (i.e. catalyst bed 18A) as a whole is selected for the particular catalytic upgrading reaction. For a moving bed (e.g. catalyst bed 18A) in a demetallation reaction system, for example, the minimum average upgrading activity level for the catalyst bed is one which removes the necessary amount of metals from the hydrocarbon feed stream when it passes through the moving bed at demetallation conditions. Similarly, for a desulfurization reaction system, the moving catalyst bed (i.e. catalyst bed 18A) removes the necessary amount of sulfur from the hydrocarbon feed stream when it passes through the moving bed at desulfurization conditions. Thus, as will be apparent to those skilled artisans, the minimum average upgrading activity level for a particular reaction system will depend on the desired degree of a contaminant, such as metals, sulfur, nitrogen, asphaltenes, etc., which the refiner desires to remove from the heavy oil feed. The degree of demetallation or desulfurization (or etc.) will typically be set by economics and the downstream processing that the heavy feed will undergo.

Further, according to preferred embodiments of the present invention, the actual average level of catalytic upgrading activity for the catalyst beds (i.e. catalyst beds 18A, 18B and 18C) as a whole is measured. Measurement of the actual average level of upgrading is made by determining the extent to which the hydrocarbon feed stream is being upgraded in the cocurrent catalyst bed system. For example, when upgrading involves demetallation, demetallation activity is measured by a determination of the residual concentration of metals remaining in the liquid effluent stream from the catalyst bed reaction system. When upgrading involves desulfurization, desulfurization activity is, analogously, measured by a determination of the residual concentration of sulfur remaining in the liquid effluent from the catalyst bed reaction system. Overall catalyst bed upgrading activity for other upgrading reactions is measured in a similar manner by determining the residual amount of the containment which is to be removed by the process. In the present preferred embodiments, the rate at which catalyst is removed from the reaction zone 19A, and the rate of catalyst replacement to the reaction zone 19A, is established by a number of economic and operating factors, which include maintaining a desired average level of catalytic upgrading activity in order to extend the catalytic life of the fixed catalyst beds 18B and 18C as long as possible.

Each of the catalyst beds 18A, 18B and 18C would consist of catalyst particles of the same or different catalytic characteristics, such as the same or different physical and/or catalytic properties. Considering the range of hydroconversion reaction capabilities which each of the catalyst beds 18A, 18B and 18C could possess, one skilled in the art will appreciate the variety of catalysts having a variety of physical properties and elemental compositions, which could be used for each of the catalyst beds 18A, 18B and 18C. It is within the spirit and scope of the present invention to encompass hydroconversion reaction systems employing catalysts possessing such shape and density which vary widely from system to system. Each of the catalyst beds 18A, 18B and 18C would typically have the same particular hydroconversion reaction (e.g. hydrometallation, hydrodenitrification, hydrodesulfurization; etc.) capability; however, the respective catalyst beds 18A, 18B and 18C could possess particular hydroconversion reaction capabilities that differ from each other. Thus, by way of example only, the catalyst particles in the upper or top essentially fixed catalyst bed 18A could possess hydrodemetallation capabilities; the catalyst particles in the lower or bottom fixed catalyst bed 18B could possess hydrodenitrification capabilities; and the catalyst particles In the lower or bottom fixed catalyst bed 18C could possess hydrosulfurization and/or any other hydrotreating capabilities.

While the present invention has been described herein with reference to particular embodiments thereof, a latitude of modification, various changes and substitutions are intended in the foregoing disclosure and it will be appreciated that in some instances some features of the invention will be employed without a corresponding use of other features without departing from the scope of the invention as set forth.

We claim:

1. A down-flow fixed bed reactor assembly comprising a reactor vessel having a reactor wall including an internal cylindrical wall; a catalyst bed support means coupled to and supported by the internal cylindrical wall of said reactor wall of said reactor vessel for supporting an essentially fixed catalyst bed in an upper hydroconversion reaction zone and for allowing a hydrocarbon feed stream to pass therethrough while preventing catalyst particles from an essentially fixed catalyst bed to exit therethrough; a container means disposed in proximity to said catalyst bed support means for assisting in slurrying generally spent catalyst particles from an essentially fixed catalyst bed in an upper hydroconversion reaction zone above said catalyst bed support means; a hydrocarbon conduit means, passing through said reactor wall of said reactor vessel and communicating with said container means, for introducing a hydrocarbon into said container means for assisting in slurrying generally spent catalyst particles from an essentially fixed catalyst bed in an upper hydroconversion reaction zone of said reactor vessel; a catalyst outlet means, passing through said reactor wall of said reactor vessel and communicating with said container means, for withdrawing a generally spent catalyst particles in slurry form from an upper hydroconversion reaction zone in said reactor vessel; and at least one lower hydroconversion reaction zone, serially disposed in said reactor vessel under said catalyst bed support means, for containing at least one fixed catalyst bed.

2. The down-flow fixed bed reactor assembly of claim 1 additionally comprising an essentially fixed catalyst bed supported by said catalyst bed support means and having a first physical and/or catalytic properties; and at least one fixed catalyst bed disposed in said at least one lower hydroconversion reaction zone and having a second physical and/or catalytic properties.

3. The down-flow fixed bed reactor assembly of claim 2 wherein said first physical and/or catalytic properties differ from said second physical and/or catalytic properties.

4. The down-flow fixed bed reactor assembly of claim 1 wherein said container means has an open container top wherethrough said hydrocarbon conduit means and said catalyst outlet means pass.

5. The down-flow fixed bed reactor assembly of claim 4 wherein said open container top has a container top diameter, and said catalyst outlet means has a catalyst outlet diameter.

6. The down-flow fixed bed reactor assembly of claim 5 wherein said container top diameter is greater than five (5) times the catalyst outlet diameter.

7. The down-flow fixed bed reactor assembly of claim 5 wherein said container means has a sloping container side that defines a container side angle with respect to a horizontal plane, said container side angle being greater than an angle of repose with respect to a horizontal plane of catalyst particles in an essentially fixed catalyst bed supported by said catalyst bed support means.

8. The down-flow fixed bed reactor assembly of claim 6 wherein said container means has a sloping container side that defines a container side angle with respect to a horizontal plane, said container side angle being greater than an angle of repose with respect to a horizontal plane of catalyst particles in an essentially fixed catalyst bed supported by said catalyst bed support means.

9. The down-flow fixed bed reactor assembly of claim 7 additionally comprising a plurality of inert pellets disposed in said reactor vessel and supported by said catalyst bed support means.

10. The down-flow fixed bed reactor assembly of claim 8 additionally comprising a plurality of inert pellets disposed in said reactor vessel and supported by said catalyst bed support means.

11. The down-flow fixed bed reactor assembly of claim 5 additionally comprising at least one brace member connected to said container means and to said internal cylindrical wall for coupling the container means to the internal cylindrical wall of said reactor vessel.

12. The down-flow fixed bed reactor assembly of claim 10 additionally comprising at least one brace member connected to said container means and to said internal cylindrical wall for coupling the container means to the internal cylindrical wall of said reactor vessel.

13. The down-flow fixed bed reactor assembly of claim 4 wherein said catalyst bed support means allows an initially treated hydrocarbon feed stream from said essentially fixed catalyst bed to pass therethrough while preventing catalyst particles from said essentially fixed catalyst bed to pass therethrough.

14. The fixed bed reactor assembly of claim 2 wherein said first physical and/or catalytic properties are essentially the same as said second physical and/or catalytic properties.

15. The fixed bed reactor assembly of claim 1 wherein said container means comprises a generally conical shaped member coupled to said internal cylindrical wall.

16. A method for retrofitting a hydroprocessing fixed bed reactor assembly comprising the steps of:

(a) providing a hydroprocessing reactor vessel comprising a reactor wall with an internal cylindrical wall; a first catalyst bed support member coupled to and supported by the internal cylindrical wall of the hydroprocessing reactor vessel; a second catalyst bed support member coupled to and supported by the internal cylindrical wall of the hydroprocessing reactor vessel; and a fixed catalyst bed disposed on said first catalyst bed support member;

(b) removing said fixed catalyst bed of step (a) from said hydroprocessing reactor vessel;

(c) disposing a container in said hydroprocessing reactor vessel above said first catalyst bed support member;

(d) passing a hydrocarbon-carrier conduit through said reactor wall such as to communicate with said container of step (c);

(e) passing a catalyst withdrawal conduit through said reactor wall such as to communicate with said container of step (c); and (f) passing a catalyst addition conduit through said reactor wall.

17. The method of claim 16 additionally comprising adding a plurality of inert pellets into said hydroprocessing reactor vessel to be supported by said first catalyst bed support member.

* * * * *